United States Patent
Lo

(10) Patent No.: US 9,225,910 B2
(45) Date of Patent: Dec. 29, 2015

(54) METHODS FOR CONTROLLING A REMOTE FLASHLIGHT SOURCE PROVIDED BY A PEER PORTABLE ELECTRONIC DEVICE IN A WIRELESS COMMUNICATIONS SYSTEM AND PORTABLE ELECTRONIC DEVICES UTILIZING THE SAME

(71) Applicant: HTC CORPORATION, Taoyuan, Taoyuan County (TW)

(72) Inventor: Pi-Lin Lo, Taoyuan (TW)

(73) Assignee: HTC CORPORATION, Taoyuan (TW)

(*) Notice: Subject to any disclaimer, the term of this patent is extended or adjusted under 35 U.S.C. 154(b) by 18 days.

(21) Appl. No.: 13/889,107

(22) Filed: May 7, 2013

(65) Prior Publication Data
US 2014/0333826 A1 Nov. 13, 2014

(51) Int. Cl.
*H04N 5/225* (2006.01)
*H04N 5/235* (2006.01)
*H05B 37/02* (2006.01)
*H04N 5/232* (2006.01)

(52) U.S. Cl.
CPC ......... *H04N 5/2354* (2013.01); *H04N 5/23203* (2013.01); *H05B 37/0209* (2013.01)

(58) Field of Classification Search
USPC ...................................................... 348/207.1
See application file for complete search history.

(56) References Cited

U.S. PATENT DOCUMENTS

| 4,816,850 | A | 3/1989 | Philipeaux et al. |
| 2005/0249486 | A1* | 11/2005 | Murray ........................... 396/56 |
| 2008/0070623 | A1 | 3/2008 | Ogawa |
| 2008/0139119 | A1* | 6/2008 | Behzad et al. ............... 455/41.2 |
| 2009/0206235 | A1* | 8/2009 | Guan et al. ..................... 250/205 |
| 2012/0182465 | A1* | 7/2012 | Lin et al. ....................... 348/371 |
| 2012/0262617 | A1 | 10/2012 | Cheng et al. |
| 2013/0222627 | A1* | 8/2013 | Earnshaw et al. .......... 348/211.2 |
| 2014/0160307 | A1* | 6/2014 | Ganesh et al. ........... 348/207.11 |

FOREIGN PATENT DOCUMENTS

| TW | 200818884 A | 4/2008 |
| TW | 201127026 A | 8/2011 |

* cited by examiner

*Primary Examiner* — Roberto Velez
*Assistant Examiner* — Stephen Coleman
(74) *Attorney, Agent, or Firm* — Birch, Stewart, Kolasch & Birch, LLP

(57) ABSTRACT

A wireless communications system. A first portable electronic device collects environment information via an image sensor, transmits the environment information to a second portable electronic device, and activates a flashlight in response to a flashlight assistant request signal for assisting in a photographic operation of the second portable electronic device. The second portable electronic device communicates with the first portable electronic device to receive the environment information, determines at least one photographic parameter for a camera module according to the environment information, transmits the flashlight assistant request signal to the first portable electronic device, and performs the photographic operation according to the photographic parameter.

28 Claims, 4 Drawing Sheets

METHODS FOR CONTROLLING A REMOTE FLASHLIGHT SOURCE PROVIDED BY A PEER PORTABLE ELECTRONIC DEVICE IN A WIRELESS COMMUNICATIONS SYSTEM AND PORTABLE ELECTRONIC DEVICES UTILIZING THE SAME

BACKGROUND OF THE INVENTION

1. Field of the Invention

The invention relates to a method for controlling a remote flashlight source, and more particularly to a method for controlling a remote flashlight source provided by a peer portable electronic device for assisting a photographic operation of the host portable electronic device.

2. Description of the Related Art

Portable electronic devices, such as mobile telephones, media players, personal digital assistants (PDAs), tablet computers, and others, are ever increasing in popularity. To avoid having to carry multiple devices, portable electronic devices are now being configured to provide a wide variety of functions. For example, a mobile telephone may no longer be used simply to make and receive telephone calls. A mobile telephone may also be a camera for taking still photographs and/or video images, an Internet browser for accessing news and information, an audiovisual media player, a messaging device (text, audio, and/or visual messages), a gaming device, a personal organizer, and have other functions as well.

Since the portable electronic devices now provide a wide variety of functions, the performance of each function becomes a key factor in attracting consumer attention when the consumer is purchasing a desirable product. For example, the processing speed of the portable electronic device, the image resolution and the picture quality of the monitor and the camera module, the audio quality of the media player, etc.

Therefore, methods of improving performance of the functions provided by the portable electronic devices are an issue worthy of consideration.

BRIEF SUMMARY OF THE INVENTION

Methods for controlling a remote flashlight source provided by a peer portable electronic device in a wireless communications system and portable electronic devices utilizing the same are provided. An exemplary embodiment of a wireless communications system comprises a first portable electronic device and a second portable electronic device. The first portable electronic device collects environment information via an image sensor, transmits the environment information to a second portable electronic device, and activates a flashlight in response to a flashlight assistant request signal for assisting in a photographic operation of the second portable electronic device. The second portable electronic device communicates with the first portable electronic device to receive the environment information, determines at least one photographic parameter for a camera module according to the environment information, transmits the flashlight assistant request signal to the first portable electronic device, and performs the photographic operation according to the photographic parameter.

An exemplary embodiment of a portable electronic device comprises a camera module, a wireless communications module and a processor. The wireless communications module transmits and receives a plurality of signals to and from a peer portable electronic device to establish a wireless communications and communicates with the peer portable electronic device. The processor obtains environment information collected by the peer portable electronic device from the signals, determines at least one photographic parameter of the camera module according to the environment information, determines whether a flashlight provided by the peer portable electronic device is required in a photographic operation according to the environment information, transmits a flashlight assistant request signal to the peer portable electronic device when determining that the flashlight provided by the peer portable electronic device is required and performs the photographic operation according to the photographic parameter.

An exemplary embodiment of a portable electronic device comprises a camera module, a wireless communications module and a processor. The wireless communications module transmits and receiving a plurality of signals to and from a peer portable electronic device to establish a wireless communications and communicates with the peer portable electronic device. The processor turns on the camera module to collect environment information, determines at least one flashlight control parameter according to the environment information, and activates a flashlight in response to a flashlight assistant request signal received from the peer portable electronic device for assisting a photographic operation of the peer portable electronic device.

An exemplary embodiment of a method for controlling a remote flashlight source comprises: establishing a wireless communications between a first portable electronic device and a second portable electronic device; collecting environment information via an image sensor of the first portable electronic device; transmitting the environment information from the first portable electronic device to the second portable electronic device for helping the second portable electronic device to determine at least one photographic parameter according to the environment information; and activating a flashlight of the first portable electronic device as a remote flashlight source for assisting in a photographic operation of the second portable electronic device when the second portable electronic device is performing the photographic operation according to the photographic parameter.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
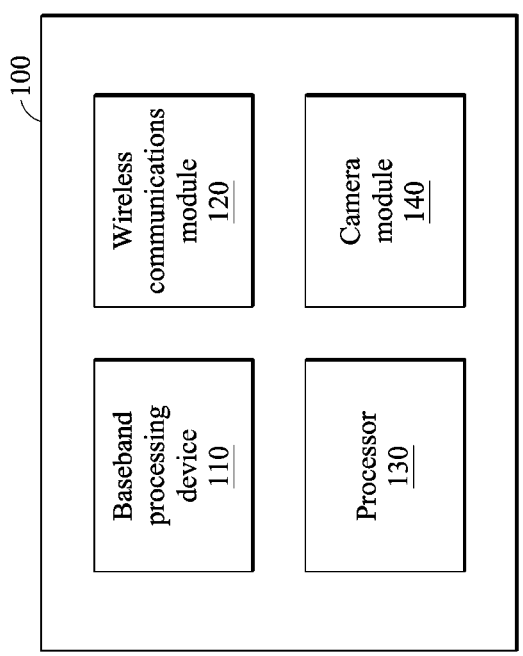
FIG. 1 is a schematic block diagram of a portable electronic device according to an embodiment of the invention.

FIG. 1 is a schematic block diagram of a portable electronic device according to an embodiment of the invention. The portable electronic device 100 may at least comprise a baseband processing device 110, a wireless communications module 120, a processor 130 and a camera module 140. Note that in order to clarify the concept of the invention, FIG. 1 presents a simplified block diagram in which only the elements relevant to the invention are shown. However, note that the invention should not be limited to what is shown in the FIG. 1.

The baseband processing device 110 may comprise a plurality of hardware devices to perform baseband signal processing, including Analog to Digital Conversion (ADC)/Digital to Analog Conversion (DAC), gain adjusting, modulation/demodulation, encoding/decoding, and so on. The wireless communications module 120 may comprise one or more RF unit to receive RF wireless signals in compliance with one or more wireless communications protocols, convert the received RF wireless signals to baseband signals, which are processed by the baseband processing device 110, or receive baseband signals from the baseband processing device 110 and convert the received baseband signals to RF wireless signals, which are later transmitted. The wireless communications module 120 may also comprise a plurality of hardware devices to perform radio frequency conversion. For example, each RF unit may comprise a mixer to multiply the baseband signals with a carrier oscillated in a desired carrier frequency. The portable electronic device 100 may also comprise a processor 130 for controlling the operation of the portable electronic device 100 and other functional components, such as a display unit and/or keypad serving as the UI (user interface), a storage unit storing data and program codes for applications or communication protocols, or others. Note that in some embodiments of the invention, the processor 130 may also be integrated in the baseband processing device 110. The camera module 140 may comprise at least an image sensor for capturing photos, images or scenes and a flashlight for assisting in photographic operations of the camera module 140.

Figure 2:
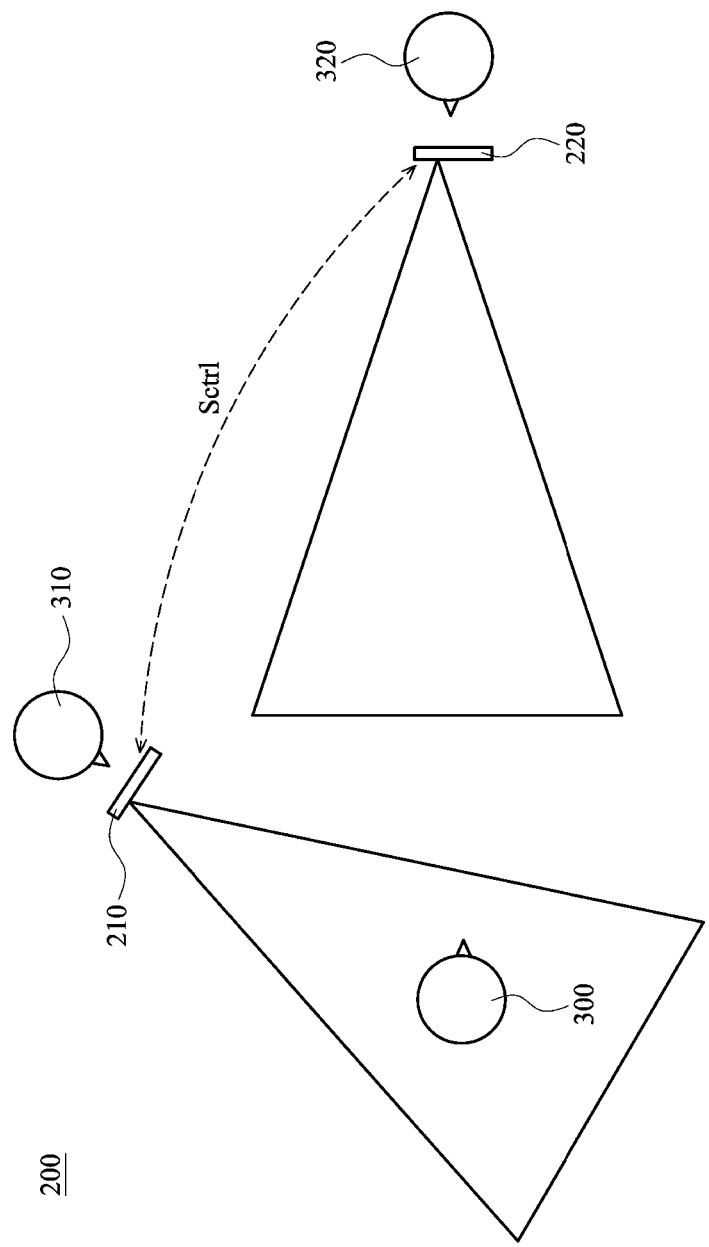
FIG. 2 shows an exemplary wireless communications system according to an embodiment of the invention.

FIG. 2 shows an exemplary wireless communications system according to an embodiment of the invention. The wireless communications system 200 may comprise more than one portable electronic device, such as the portable electronic devices 210 and 220. The user 310 is the one holding the portable electronic devices 210, the user 320 is the one holding the portable electronic devices 220, and the user 300 is the one to be photographed. The triangle extended from the portable electronic devices 210 represents the flashlight range of the portable electronic devices 210, and the triangle extended from the portable electronic devices 220 represents the flashlight range of the portable electronic devices 220. The portable electronic devices 210 and 220 may at least comprise a baseband processing device, a wireless communications module, a processor and a camera module as shown in FIG. 1. Details of the baseband processing device, the wireless communications module, the processor and the camera module may be referred in the discussion of FIG. 1, and are omitted here for brevity. According to an embodiment of the invention, the portable electronic devices 210 and 220 may communicate with each other and exchange some information, and one of the portable electronic devices may provide its flashlight to serve as a remote flashlight source when the other one is performing a photographic operation. According to an embodiment of the invention, the photographic operation may be selected from a group comprising capturing an image, recording a video and capturing a plurality of images for continuous shooting.

Figure 3:
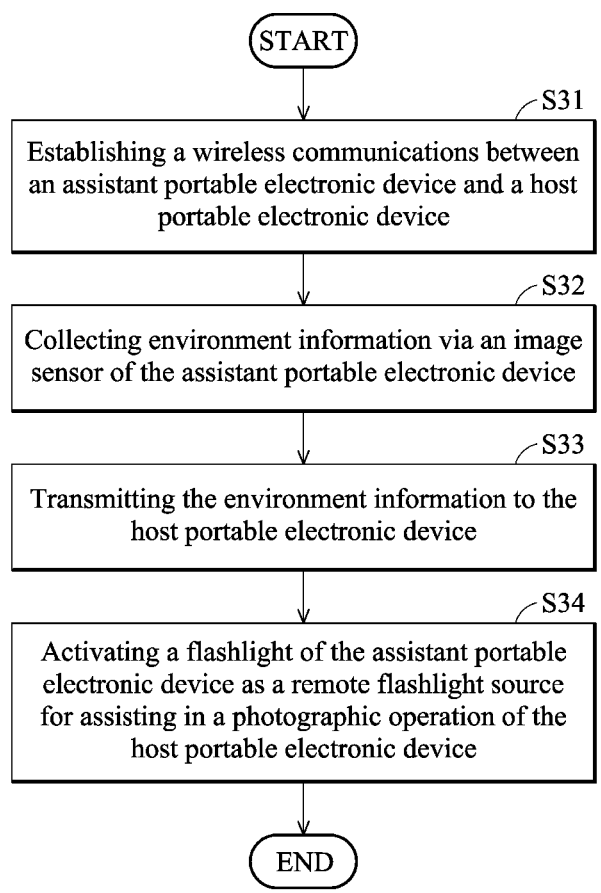
FIG. 3 shows a flow chart of a method for controlling a remote flashlight source according to an embodiment of the invention.

FIG. 3 shows a flow chart of a method for controlling a remote flashlight source according to an embodiment of the invention. In FIG. 3, a main concept of controlling a remote flashlight source is first introduced. To begin, a wireless communications is first established between an assistant portable electronic device (for example, the portable electronic device 210 as shown in FIG. 2) and a host portable electronic device (for example, the portable electronic device 220 as shown in FIG. 2) (Step S31). The host and assistant portable electronic devices may recognize and synchronize with each other via the wireless communications. Details of the reorganization and synchronization will be discussed further in the following paragraphs.

Next, environment information is collected via an image sensor of the assistant portable electronic device (Step S32). According to an embodiment of the invention, the assistant portable electronic device may turn on (or enable, activate, etc.) its camera module and collect environment information by capturing at least one image (or scene, photo, etc.) via the image sensor and analyzing the captured image to obtain the environment information. The environment information may be background lighting conditions in the image, background color temperatures in the image, subject(s) lighting conditions of one or more subject(s) in the image (for example, the user 300 to be pictured as shown in FIG. 2), subject(s) lighting conditions of one or more subject(s) in the image, subject(s) color temperatures, and/or subject(s) local features. According to an embodiment of the invention, the local features may be, for example, face color, skin color, face position and skin position of the one or more subject(s).

After collecting the environment information, the assistant portable electronic device may transmit the environment information to the host portable electronic device to facilitate the host portable electronic device to determine at least one photographic parameter according to the environment information (Step S33). According to an embodiment of the invention, the photographic parameter may be a camera scene mode, an ISO speed, an exposure index, a white balance setting, a focal position, a focal length and/or a shutter speed. Finally, when the host portable electronic device is performing a photographic operation according to the photographic parameter, the assistant portable electronic device may activate its flashlight as a remote flashlight source to assist in the photographic operation of the host portable electronic device (Step S34).

Figure 4:
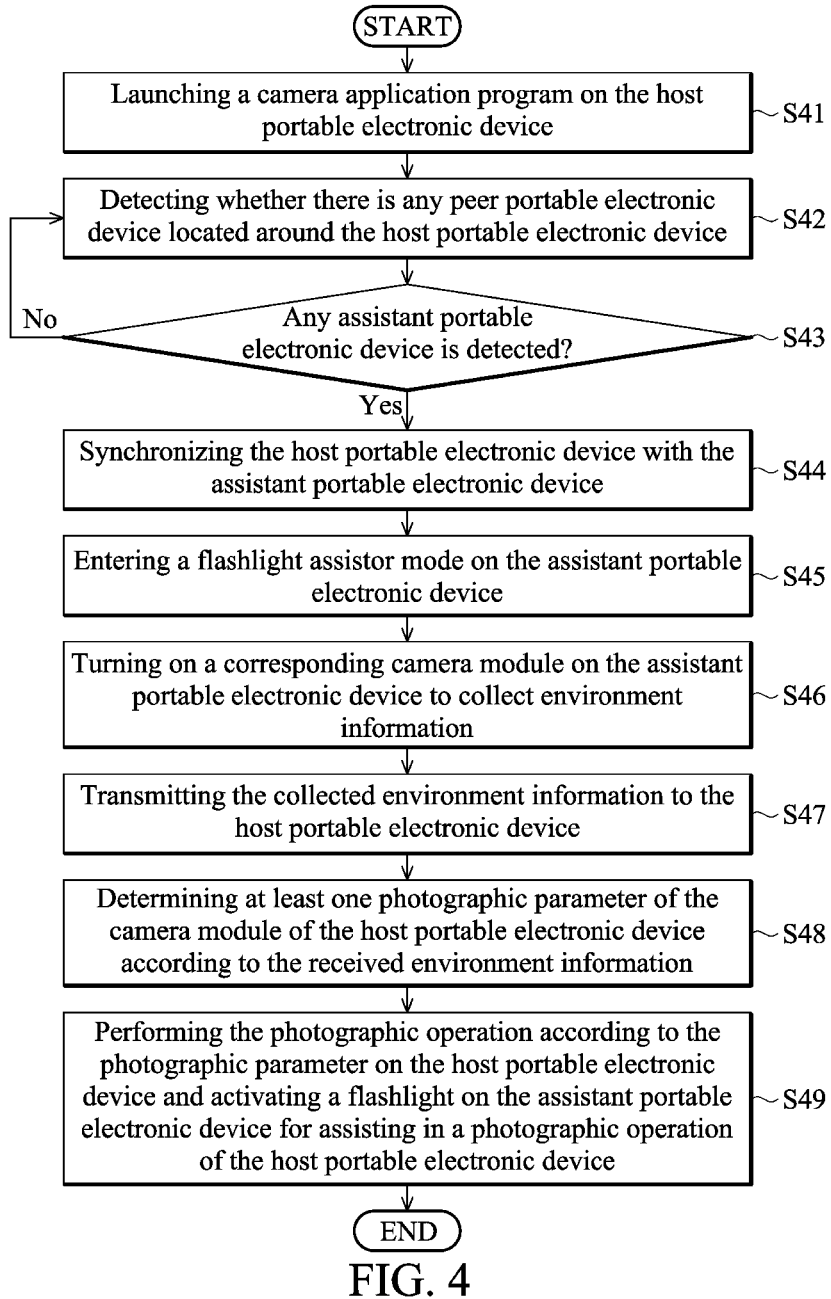
FIG. 4 shows a more detailed flow chart of a method for controlling a remote flashlight source according to an embodiment of the invention.

FIG. 4 shows another flow chart for illustrating the method for controlling a remote flashlight source in more detailed according to an embodiment of the invention. When a user holding a host portable electronic device (for example, the portable electronic device 220 as shown in FIG. 2) is planning to perform a photographic operation, the user of the host portable electronic device may first launch a camera application program installed in the operating system of the host portable electronic device via an user interface (UI) (Step S41). When launching the camera application program, the processor of the host portable electronic device may turn on (or, enable, activate, etc.) a camera module thereof. Next, the processor of the host portable electronic device may keep detecting whether there is any peer electronic device located around the host portable electronic device (Step S42).

According to an embodiment of the invention, the processor of the host portable electronic device may actively scan whether there is any peer portable electronic device located in the wireless communications system. For example, the host portable electronic device may broadcast a predefined message, a predefined string, a predefined signal, or the likes in the wireless communications system. When a peer portable electronic device located in the wireless communications system receives and recognizes the predefined message, string, or signal, the peer portable electronic device may transmit an acknowledgement message, string or signal to the host portable electronic device, and become an assistant portable electronic device (for example, the portable electronic device 210 as shown in FIG. 2) in the following photographic operations.

According to an embodiment of the invention, the host and assistant portable electronic devices may exchange the predefined message, string, or signal via a near field communication (NFC), an infrared ray communication, or others, established therebetween.

In addition, a predetermined application program (such as a flashlight assistant application program or a wireless recognition application program) may be developed and pre-installed in the host and assistant portable electronic devices. In this manner, only the portable electronic devices having the predetermined application installed therein may recognize the predefined message, string, or signal transmitted by the host portable electronic device, and can support the flashlight assistant function.

Note that besides performing active scans, the host portable electronic device may also passively wait for any predefined message, string or signal transmitted by an assistant portable electronic device in the wireless communications system. For example, users holding the portable electronic devices may place their portable electronic devices closely, or may tag their portable electronic devices to each other, so as to help the portable electronic devices to find out or recognize each other. There may be still some other non-discussed methods that can be utilized in step S42 for detecting peer portable electronic device, and therefore, the invention should not be limited thereto.

When it is determined that there is no assistant portable electronic device detected in Step S43, the host portable electronic device may stay in step S42 and continue detecting. Otherwise, the host portable electronic device may synchronize with the assistant portable electronic device (Step S44). The synchronization may be performed by launching the predetermined application program (such as the flashlight assistant application program or the wireless recognition application program as discussed above) on both the host and assistant portable electronic devices, and exchanging the MAC (medium access control) address of each other so as to establish a more advanced wireless communications (more advanced than the one used in step S42) between the host and assistant portable electronic devices, such as a Bluetooth communication, a WiFi communication, or others. Note that in some embodiment of the invention, the more advanced wireless communications may also be directly established when detecting and recognizing the assistant portable electronic device in step S42, and the invention should not be limited thereto.

Next, the assistant portable electronic device may enter a flashlight assistor mode (Step S45). When the assistant portable electronic device enters the flashlight assistor mode, a predetermined UI for the assistant portable electronic device to operate under the flashlight assistor mode may be presented on the screen. Next, the assistant portable electronic device may turn on the corresponding camera module to collect environment information (Step S46). According to an embodiment of the invention, the processor of the assistant portable electronic device may turn on the corresponding camera module in the background and direct the camera module to capture at least one image via an image sensor for collecting the environment information. Here, "in the background" means the user may not notice that the image sensor is capturing image. For example, the image captured by the image sensor is not shown on the screen. However, in some embodiments of the invention, the image captured by the image sensor may also be shown on the screen of the assistant portable electronic device for the user to preview the image, and the invention should not be limited thereto.

The processor of the assistant portable electronic device may further analyze the captured image according to some predetermined algorithms to obtain the environment information. The environment information may be background lighting conditions, background color temperatures, subject(s) lighting conditions of one or more subject(s) in the image, subject(s) color temperatures, and subject(s) local features. According to an embodiment of the invention, the local features may be, for example, face color, skin color, face position and skin position of the subject(s).

In addition, according to another embodiment of the invention, the processor of the assistant portable electronic device may further determine at least one flashlight control parameter according to the environment information. The flashlight control parameter may be, for example and not limited to, flashlight strength, a flashlight color temperature and a flashlight duration.

According to yet another embodiment of the invention, the processor of the assistant portable electronic device may further activate the flashlight for one or more times for photometry in the stage of collecting environment information. Note that the environment information and the flashlight control parameter may be selectively shown in the screen of the assistant portable electronic device and the user holding the assistant portable electronic device may be allowed to adjust the environment information and/or the flashlight control parameter when they are visible to the user.

Next, the assistant portable electronic device may transmit the collected environment information (and further the flashlight control parameter utilized by the assistant portable electronic device in some embodiments) to the host portable electronic device (Step S47). The collected environment information (and further the flashlight control parameter in some embodiments) may be transmitted via the wireless communications established in step S44 or S42.

After receiving the signals transmitted by the assistant portable electronic device, the processor of the host portable electronic device may obtain the environment information collected by the assistant portable electronic device from the signals and determine at least one photographic parameter of its camera module according to the environment information (and further the flashlight control parameter in some embodiments) (Step S48). Note that in some embodiment of the invention, the host portable electronic device may also collect some environment information via is camera module and determine the photographic parameter further according to the environment information collected by itself, so as to come out the optimal photographic parameter(s) that can achieve the best performance.

According to an embodiment of the invention, the photographic parameter may be a camera scene mode, an ISO speed, an exposure index, a white balance setting, a focal position, a focal length and/or a shutter speed. For example, the processor of the host portable electronic device may determine an optimum camera scene mode according to the background lighting conditions and the local features of the one or more subject(s). For another example, the processor of the host portable electronic device may determine an optimum ISO speed according to the flashlight strength and flashlight duration that can be provided by the assistant and/or the host portable electronic device. For yet another example, the processor of the host portable electronic device may determine an optimum white balance setting according to the background color temperature, the subject(s) color temperature and/or the flashlight color temperature that can be provided by the assistant and/or the host portable electronic device.

Note that when the flashlight control parameter is transmitted to the host portable electronic device, the processor of the host portable electronic device may further adjust the flashlight control parameter and transmit the adjusted flashlight control parameter back to the assistant portable electronic device in step S48. In addition, the processor of the host portable electronic device may further determine whether the flashlight provided by the peer portable electronic device is required based on the collected environment information, the flashlight control parameter and/or the determined photographic parameter in step S48.

The processor of the host portable electronic device may transmit a flashlight assistant request signal (for example, the signal Sctrl as shown in FIG. 2) to the assistant portable electronic device when determining that the flashlight provided by the assistant portable electronic device is required. According to an embodiment of the invention, the host portable electronic device may transmit the flashlight assistant request signal to the assistant portable electronic device as a shutter of the host portable electronic device is pressed.

Finally, the host portable electronic device may perform the photographic operation according to the photographic parameter determined in step S48 and the assistant portable electronic device may activate a flashlight in response to the flashlight assistant request signal for assisting a photographic operation of the host portable electronic device (Step S49). Note that in some embodiments of the invention, the flashlight control parameter may further be adjusted by either the host portable electronic device or the assistant portable electronic device during the photographic operation. When the flashlight control parameter is adjusted by the host portable electronic device, the processor of the host portable electronic device may further transmit the adjusted flashlight control parameter back to the assistant portable electronic device as discussed above.

When the flashlight assistant function is provided by the portable electronic devices, the camera function is enhanced and the picture quality of the photos captured by the camera module can also be greatly improved. The flashlight assistant function is very attractive to user since the flashlight provided by a portable electronic device is generally not strong enough. The weak flashlight is undesirable especially when taking pictures for the subject that is far from the camera or portable electronic device. Therefore, when another portable electronic device located in any place within a wireless communications system can provide its own flashlight as a remote flashlight source, not only can the picture qualities be greatly improved, but also the position and angle of the remote flashlight source can be flexibly controlled.

Note that the invention concept may also be extended to control the remote flashlight sources provided by more than one assistant portable electronic device. Those who are skilled in this technology can easily derive the details of the methods for controlling more than one remote flashlight source based on the concept discussed above, thus the illustrations are omitted here for brevity.

Note further when two or more than two portable electronic devices are in operation, the predetermined application installed therein may automatically determine whether to provide flashlight(s) from the assistant portable electronic device(s) only, or provide the flashlights from both the host and the assistant portable electronic device(s) based on the collected environment information. In addition, the number of flashlight sources may also be controlled or determined manually by the user operating the portable electronic device, and the invention should not be limited thereto.

In addition, the flashlight discussed above may be provided in either a flashlight mode or a torch mode. In the flashlight mode, the flashlight may be provided (or, turned on, enabled or activated) for only one-shot or only once for a short period of time when a shutter is pressed. In the torch mode, the flashlight may be continuously provided (or, turned on, enabled or activated) for a long period of time, and may be stopped (or, turned off, disabled or deactivated) in response to a flashlight disable request signal issued either by either the assistant portable electronic device or the host portable electronic device. Therefore, not only when performing the photographic operation for capturing an image, the invention concept may also be applied when the user uses the portable electronic device to perform video recording or continuous shooting, so as to provide the remote flashlight source(s) to assist the video recording or continuous shooting operations.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A wireless communications system, comprising:
   a first portable electronic device, including a first flashlight, collecting environment information via an image sensor, transmitting the environment information to a second portable electronic device, and activating the first flashlight in response to a flashlight assistant request signal for assisting in a photographic operation of the second portable electronic device; and
   the second portable electronic device, including a second flashlight, different from the first flashlight, and a camera module, communicating with the first portable electronic device to receive the environment information, determining at least one photographic parameter for the camera module according to the environment information, transmitting the flashlight assistant request signal to the first portable electronic device, and performing the photographic operation according to the photographic parameter,
   wherein the first portable electronic device collects the environment information by capturing at least one first image via the image sensor,
   wherein the first portable electronic device further determines at least one flashlight control parameter according to the environment information and transmits the flashlight control parameter to the second portable electronic device, and the second portable electronic device determines the photographic parameter according to the environment information and the flashlight control parameter, and wherein flashlight control parameter is different from the photographic parameter, and is transmitted back to the first portable electronic device by the second portable electronic device.

2. The wireless communications system as claimed in claim 1, wherein the second portable electronic device transmits the flashlight assistant request signal to the first portable electronic device when a shutter of the second portable electronic device is pressed.

3. The wireless communications system as claimed in claim 1, wherein the flashlight control parameter is selected from a group comprising: flashlight strength, flashlight color temperature and flashlight duration.

4. The wireless communications system as claimed in claim 1, wherein the photographic parameter is selected from a group comprising: a camera scene mode, an ISO speed, an exposure index, a white balance setting, a focal position, a focal length and a shutter speed.

5. The wireless communications system as claimed in claim 1, wherein the first portable electronic device further activates the first flashlight for one or more times for photometry before activating the first flashlight for assisting in the photographic operation.

6. The wireless communications system as claimed in claim 1, wherein the second portable electronic device further adjusts the flashlight control parameter and transmits the adjusted flashlight control parameter to the first portable electronic device before performing the photographic operation.

7. The wireless communications system as claimed in claim 1, wherein the first flashlight is activated in either a flashlight mode or a torch mode, in the flashlight mode, the first flashlight is activated once for a short period of time in response to the flashlight assistant request signal and in the torch mode, the first flashlight is activated continuously for a long period of time in response to the flashlight assistant request signal and is deactivated in response to a flashlight disable request signal.

8. The wireless communications system as claimed in claim 1, wherein the photographic operation is selected from a group comprising capturing a second image, recording a video and capturing a plurality of images for continuous shooting.

9. The wireless communication system as claimed in claim 1, wherein the flashlight control parameter is adjusted by either the first portable electronic device or the second portable electronic device during the photographic operation.

10. The wireless communications system as claimed in claim 1, wherein the environment information is selected from a group comprising: background lighting conditions, background color temperatures, subject(s) lighting conditions of one or more subject(s) in the image, subject(s) color temperatures, and subject(s) local features.

11. The wireless communications system as claimed in claim 10, wherein the subject(s) local features are selected from a group comprising: face color, skin color, face position and skin position of the subject(s).

12. A portable electronic device, comprising:
a first camera module;
a first flashlight;
a wireless communications module, transmitting and receiving a plurality of signals to and from a peer portable electronic device to establish a wireless communications and communicating with the peer portable electronic device, the peer portable electronic device including a second flashlight, different from the first flashlight; and a processor, obtaining environment information collected by the peer portable electronic device from the signals, determining at least one photographic parameter of the camera module according to the environment information, determining whether the second flashlight provided by the peer portable electronic device is required in a photographic operation according to the environment information, transmitting a flashlight assistant request signal to the peer portable electronic device when determining that the second flashlight provided by the peer portable electronic device is required and performing the photographic operation according to the photographic parameter, wherein the peer portable electronic device collects the environment information by capturing a first image via a second camera module of the peer portable electronic device, determines at least one flashlight control parameter according to the environment information and transmits the flashlight control parameter to the processor, the flashlight control parameter being different from the photographic parameter, and wherein the processor determines the photographic parameter further according to the flashlight control parameter, and transmits the flashlight control parameter back to the peer portable electronic device.

13. The portable electronic device as claimed in claim 12, wherein the processor transmits the flashlight assistant request signal to the peer portable electronic device when a shutter is pressed.

14. The portable electronic device as claimed in claim 12, wherein the environment information is selected from a group comprising: background lighting conditions in an image captured by the peer portable electronic device, background color temperatures, subject(s) lighting conditions of one or more subject(s) in the image, subject(s) color temperatures, and subject(s) local features.

15. The portable electronic device as claimed in claim 12, wherein the processor further adjusts the flashlight control parameter and transmits the adjusted flashlight control parameter to the peer portable electronic device before performing the photographic operation.

16. The portable electronic device as claimed in claim 12, wherein the second flashlight is provided by the peer portable electronic device in either a flashlight mode or a torch mode, in the flashlight mode, the second flashlight is activated once for a short period of time in response to the flashlight assistant request signal and in the torch mode, the second flashlight is activated continuously for a long period of time in response to the flashlight assistant request signal and is deactivated in response to a flashlight disable request signal.

17. The portable electronic device as claimed in claim 12, wherein the photographic operation is selected from a group comprising capturing an image, recording a video and capturing a plurality of images for continuous shooting.

18. The portable electronic device as claimed in claim 12, wherein the processor further adjusts the flashlight control parameter and transmits the adjusted flashlight control parameter to the peer portable electronic device during the photographic operation.

19. The portable electronic device as claimed in claim 12, wherein the processor further adjusts the flashlight control parameter before or during the photographic operation of the peer portable electronic device.

20. A portable electronic device, comprising:
a camera module;
a first flashlight;
a wireless communications module, transmitting and receiving a plurality of signals to and from a peer portable electronic device to establish a wireless communications and communicating with the peer portable electronic device, the peer portable electronic device including a second flashlight, different from the first flashlight; and
a processor, turning on the camera module to collect environment information, determining at least one flashlight control parameter according to the environment information by capturing a first image via the camera module, and activating the first flashlight in response to a flashlight assistant request signal received from the peer portable electronic device for assisting a photographic operation of the peer portable electronic device,
wherein the processor further transmits the flashlight control parameter to the peer portable electronic device for helping the peer portable electronic device to determine at least one photographic parameter according to the environment information and the at least one flashlight control parameter, and receives the flashlight control parameter transmitted back from the peer portable electronic device.

21. The wireless communications system as claimed in claim 20, wherein the flashlight control parameter is selected from a group comprising: flashlight strength, a flashlight color temperature and a flashlight duration.

22. The portable electronic device as claimed in claim 20, wherein the processor further activates the first flashlight for one or more times for photometry before activating the first flashlight for assisting in the photographic operation of the peer portable electronic device.

23. The portable electronic device as claimed in claim 20, wherein the first flashlight is activated in either a flashlight mode or a torch mode, in the flashlight mode, the first flashlight is activated once for a short period of time in response to the flashlight assistant request signal and in the torch mode, the first flashlight is activated continuously for a long period of time in response to the flashlight assistant request signal and is deactivated in response to a flashlight disable request signal.

24. The portable electronic device as claimed in claim 20, wherein the processor further directs the camera module to capture at least one image via an image sensor comprised therein for collecting the environment information.

25. The portable electronic device as claimed in claim 24, wherein the environment information is selected from a group comprising: background lighting conditions, background color temperatures, subject(s) lighting conditions of one or more subject(s) in the image, subject(s) color temperatures, and subject(s) local features.

26. A method for controlling a remote flashlight source, comprising:
establishing a wireless communications between a first portable electronic device and a second portable electronic device, the first portable electronic device including a first flashlight, the second portable electronic device including a second flashlight, different from the first flashlight;
collecting environment information by capturing a first image via an image sensor of the first portable electronic device;
determining at least one flashlight control parameter for the first portable electronic device according to the environment information;
transmitting the environment information and the at least one flashlight control parameter from the first portable electronic device to the second portable electronic device for helping the second portable electronic device to determine at least one photographic parameter according to the environment information and the at least one flashlight control parameter, the at least one flashlight control parameter being different from the at least one photographic parameter;
transmitting the at least one flashlight control parameter back to the first portable electronic device from the second portable electronic device; and
activating the first flashlight of the first portable electronic device to serve as a remote flashlight source for assisting in a photographic operation of the second portable electronic device when the second portable electronic device is performing the photographic operation according to the photographic parameter.

27. The method as claimed in claim 26, further comprising:
activating the first flashlight of the first portable electronic device for one or more times for photometry before activating the first flashlight for assisting in the photographic operation.

28. The method as claimed in claim 26, wherein the photographic operation is selected from a group comprising capturing an image, recording a video and capturing a plurality of images for continuous shooting.

* * * * *